May 11, 1965     E. P. CAVIGLIA     3,183,144
METHOD OF MAKING POLYETHYLENE SEALS
Filed May 3, 1961
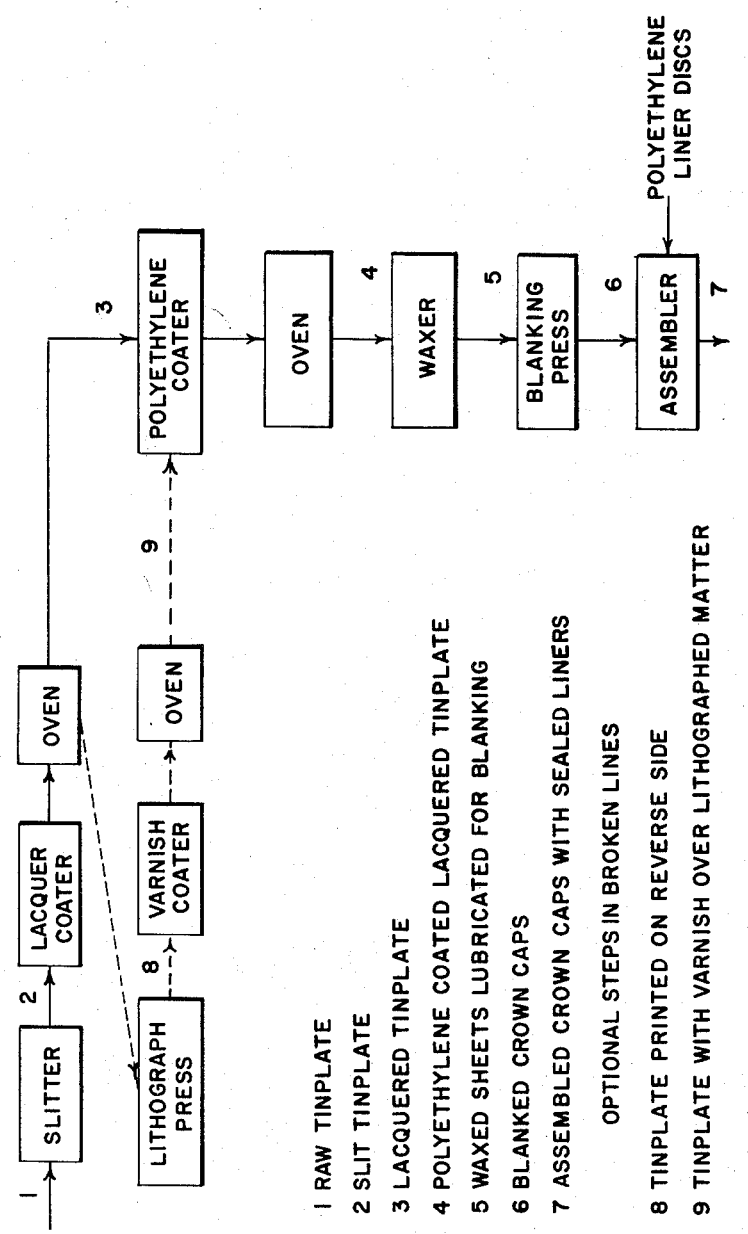
INVENTOR.
Enzo P. Caviglia
BY
*Curtis, Morris, & Safford*
ATTORNEYS

# United States Patent Office 3,183,144
Patented May 11, 1965

3,183,144
METHOD OF MAKING POLYETHYLENE SEALS
Enzo P. Caviglia, Crawfordsville, Ind., assignor to The
Hoosier Crown Corporation, Crawfordsville, Ind.
Filed May 3, 1961, Ser. No. 107,372
11 Claims. (Cl. 161—252)

This invention relates to methods of making polyethylene seals, and to products produced by said methods. The invention relates particularly to methods of sealing polyethylene to lacquered surfaces, and to products produced by said methods.

The methods of the invention are particularly adaptable to the manufacture of lacquered metal crown caps having a polyethylene liner sealed therein by means of an intermediate layer of heat-treated polyethylene.

The familiar crown cap, commonly used on beverage bottles, is one of the few industrial products which has undergone no major change in the past forty years. Even in this age of plastics, its liner is still made of a cork composition applied to the crown with egg albumin as an adhesive, since all previous attempts to replace these natural products with synthetic materials have been found to have serious drawbacks in practice.

Two natural products are used in the cork composition which forms the crown cap liner: the cork itself and a binder, commonly hide glue. Cork, as is well known, is a tree bark, and as such is subject to variations in weather during its growth. Its quality, in consequence, varies from place to place and from year to year in a complex pattern. It must be subjected to complex and expensive processes before it is sufficiently uniform to be used at all industrially. Hide glue is also a somewhat variable product. The discs formed principally from these two materials therefore tend to vary unpredictably in many characteristics such as appearance, resilience, and moisture content.

Further, cork is an imported industrial raw material obtained chiefly from Portugal, Spain, and North Africa. Transport of the raw material thus becomes a substantial item in its cost, and supply of the material is always subject to the uncertainties of international trade.

The albumin used to adhere the composition cork liner to the inside of the crown cap is also subject to the unpredictable variations of a natural product. Moreover, it provides an excellent medium for the growth of microorganisms, and precautions must be taken to prevent its contamination by these organisms.

Ideally, it would be highly desirable to substitute a synthetic material such as a plastic for the cork composition liner now used in crown caps. Control of the quality of such a synthetic product would overcome many of the difficulties now encountered with natural products, promoting greater uniformity in the manufactured article. Among the plastics which might be used as substitutes for composition cork in crown caps, polyethylene (or a related substance such as polypropylene) would have the best overall characteristics. The physical properties of polyethylene are exactly those needed in a crown cap: it is insoluble in water, completely tasteless and odorless, and stable under conditions encountered in use as a crown cap liner. It offers an attractive and "clean" appearance. It is roughly competitive in price with composition cork and will probably become cheaper in the future, whereas the price of cork will probably continue to rise. Further, the use of polyethylene liners obviates the cost of inserting aluminum or vinyl "spots" now often necessary with cork composition liners to prevent contact between the cork and the liquid contents of a bottle.

Until now, polyethylene liners have not been used extensively in practice for lining crown caps, because the same inert chemical structure which makes polyethylene an ideal material for crown liners also makes it resist bonding with most adhesives. Experience has convinced those skilled in the art that there is no practical way to adhere polyethylene to the lacquered tin plate which ordinarily forms the inside surface of a crown cap. Also, the crown cap industry is a highly competitive one which produces an enormous number of units at extremely high speed and close tolerances. The industry is reluctant to accept any modification in procedure which would tend to decrease production speed or increase costs, however advantageous this modification might be in some other ways.

However, a method has now been found of bonding polyethylene liners to lacquered crown caps using a thin film of heat-treated polyethylene as an adhesive. The novel method can easily be adapted to existing machinery with minimum modification at a minimum expense.

The process conventionally used in the art for the manufacture of crown caps with cork composition liners commonly employs sheets of tin plate which comprise sheet steel, for example about ten mils thick, electrolytically coated on both sides with an extremely thin coating of tin. The sheets are suitably roller coated on one side with a gold-colored sanitary lacquer, and then are baked to harden the lacquer. The use of such a lacquer is necessary, particularly if the finished crowns are to be used to seal containers for carbonated beverages such as beer or soft drinks which are commonly contained under pressures of 40–100 p.s.i. Under such conditions, neither a liner nor the tin coating on the substrate metal of the crown offers sure protection against contamination of the contents. Thus, the tin coating of the tin plate employed is not strictly continuous, and, in the absence of a lacquer, the underlying steel is subject to attack and corrosion by the container contents. Further, the lacquer protects shank or rim portions of the cap, which cannot be even partially protected by a liner.

The uncoated side of the lacquered crown cap may then be printed with identifying or advertising matter according to the customer's requirements, and, if desired, the printed surface varnished with a transparent varnish and the sheet baked once more to harden the transparent varnish.

The printed and varnished sheets are then waxed with paraffin on the printed side and passed through double-action presses which punch out and form the individual crown shells, commonly 506 per sheet. By processes now currently used, the shells are then passed through machines ("assemblers") which apply a drop of alubumin glue to the inside of each shell, drop a composition cork disc into each shell, and apply heat (about 275° F.) and pressure for about four seconds to adhere the cork disc to the lacquered surface. The completed crowns are then automatically boxed.

To practice the present invention, using a thin coat of polyethylene as the "adhesive" to adhere a polyethylene disc to a lacquered crown cap, the procedures and machinery of the prior art need be modified only slightly to adapt them to the novel process of the present invention. According to a preferred embodiment of the invention, shown in FIGURE 1 of the accompanying drawings, raw tinplate is first slit to dimensions appropriate for further handling in the machinery now conventionally used in the manufacture of crown caps. The slit metal is then passed through conventional coater means, whereby a film of sanitary lacquer is applied to one surface. The lacquered metal is then baked.

If the finished crowns are to carry decorative or advertising matter, the sheets are fed to a lithographic press for printing of the reverse, or unlacquered, side. The printed surface is then varnished and baked.

After this optional printing, or directly after lacquering and baking, the lacquered metal sheets are coated on their lacquered side with a thin coating of polyethylene applied by a roller coater, spot coater, automatic silk screen machine, or any other suitable coating device. The sheets are next baked under controlled conditions of time and temperature, and are then passed through a waxer to punch presses in the usual manner.

In the assemblers, the application of further adhesive is omitted, but polyethylene liner discs are sealed into the crown cap—by means of the intermediate thin coating of heat-treated polyethylene—by application of heat and pressure, as is now used for cork composition liners.

In another embodiment of the invention, the lacquered metal sheets may be coated with polyethylene on their lacquered side, and then baked, before optional printed matter is applied to their reverse side. The temperature and times used to bake the varnish applied over the printed surface (usually about 300° F. or less for periods of 8 minutes or less) are insufficiently detectibly to alter the polyethylene film earlier applied. Waxing, punch pressing, and assembly steps follow in the usual manner.

Alternatively, the lacquered sheets may be coated with polyethylene on their lacquered surface, and polyethylene liner discs may be sealed thereto, before crown caps are punch pressed from the metal sheets. In such an embodiment, the stamping out operation is the last step in the production of a finished crown cap.

In still other embodiments of the invention, lacquered and optionally lithographed, varnished and waxed metal sheets are first formed into crown caps before a polyethylene film is baked onto the lacquered surface. Polyethylene liner discs are then sealed into the caps in the usual fashion.

The final product is shown in FIGURE 2 of the drawings. FIGURE 2 is a front sectional view through a crown cap liner made as described above, and shows blanked crown 21, such as of tin plate, having on its interior surface thin lacquer film 22 and, thereover, thin polyethylene film 23. Seated within the crown and sealed to polyethylene film 23 is polyethlene disc 24 which may have the advantageous cross-section shown in FIGURE 2, or any other cross-section permitting intimate contact between a portion of the disc and the polyethylene film to which it is sealed.

The heart of the present invention, exemplified by reference to the production of crown caps, is the discovery that it is possible to use polyethylene itself as an adhesive to bond polyethylene liner discs to the lacquered metal of the crown caps. A thin coat of polyethylene, applied to the lacquered metal from which the caps are formed, and heated under specific conditions of time and temperature, becomes modified by heating in such a way to become capable simultaneously of forming a very strong bond with the lacquered metal while retaining its ability to form a strong bond with another polyethylene surface.

The properties of polyethylene are known to change under the application of heat. These changes are usually broadly attributed to "oxidation," though they may also include a depolymerization of a certain portion of the polyethylene, followed by oxidation and/or cross-linking of some of the resulting low molecular weight materials. By the process of the present invention, involving the controlled heat treatment of polyethylene films, it is possible to effect these changes to a degree such that the polyethylene is modified sufficiently to adhere to a non-polyethylene surface, but without such thermal degradation as prevents simultaneous bonding to other polyethylene bodies.

Thus, using the process of the invention, it is possible to transform the polyethylene into a transitional stage between its original form, which adheres only to another polyethylene surface, and a golden-yellow substance, harder than varnish, which adheres tenaciously to almost any substrate, but cannot be laminated to polyethylene. Between these two extremes, a stage has now been found in which polyethylene has properties which enable it to adhere both to polyethylene and to a lacquered surface, and thus to fulfill perfectly the requirements for an adhesive in embodiments such as crown cap liners.

This transformation of polyethylene into a material with desired adhesive properties is both time and temperature dependent. This choice of variables is particularly convenient in adapting the polyethylene sealing procedure to extant manufacturing processes such as the manufacture of crown caps.

In applying the intermediate thin coating of polyethylene which acts as the adhesive between the lacquered metal and the relatively thick polyethylene liner of a crown cap, several techniques can be employed. Thus, the polyethylene can be applied to the lacquered metal sheet in the form of a powder which is later fused and heat treated to form the adhesive coating. Also, the polyethylene can be applied dispersed in a volatile solvent in the form of a solution or emulsion. The nature of the volatile dispersing fluid is not critical to the process, so long as it is one which will dissolve or suspend a suitable amount of polyethylene and which will evaporate before or during the heat treating process. Suitable organic fluids include aliphatic hydrocarbon solvents such as n-pentane, hexane and heptane, aromatic hydrocarbon solvents such as benzene, toluene, and xylene, cycloaliphatic solvents such as cyclohexane and methyl cyclopentane, and oxygenated organic solvents such as tetrahydrofuran, ethyl acetate, and diisopropyl ether.

Polyethylene is suitably combined with materials of this sort in amounts varying between about 5-20 parts by weight per 100 parts of solution, preferably between about 8-12 parts by weight per 100 parts of solution. Application, by means of a roll coater, spot coater, etc., of a solution of 10 parts by weight of polyethylene in 90 parts by weight of mixed hydrocarbon solvents commercially marketed under the name "Solvesso 100" (high boiling xylol fraction—B.P. 316°-349° F.) has given particularly good results.

The use of organic fluids can be avoided, if such is desirable, by applying the polyethylene to the lacquered surface in the form of an aqueous emulsion containing about 20 to about 50 percent, suitably about 40 percent, of dispersed polyethylene solids.

Such an amount of polyethylene is applied to a lacquered surface as will produce a polyethylene film between about 0.05 mil and about 0.5 mil in thickness. Such films correspond with a polyethylene area density of between about 1 to about 10 milligrams per square inch. Very strong bonds are observed using an area density of about 5 mgm./in.$^2$, though for reasons of economy it is convenient to use an area density of about 2 mgm./in.$^2$. Bonding has been observed at area densities as low as 0.5 mgm./in.$^2$, and such bonds are satisfactory in many applications where a higher bond strength is not necessary.

After application of the polyethylene to the lacquered sheets, the sheets are baked under controlled conditions of temperature and time. In general, for a polyethylene of the DYNH type, the baking temperature may vary between 350° F. and 420° F., and baking times may vary between three minutes to half an hour, or more, though long periods are, of course, less acceptable commercially. Generally, when lower temperatures within this range are employed, a longer period of baking is indicated and, conversely, when higher temperatures within this range are used, the baking time may be decreased.

For polyethylene of this type, temperatures between about 365° F. and about 420° F. are preferred. In this range of temperatures, the heating period can range between about 4 minutes to about 20 minutes. At temperatures above 420° F., the time periods for baking become too short to avoid formation of hard, varnish-like coatings which are not suitably adherent. At temperatures below those specified, baking periods become too long to be commercially feasible, and the bonds formed to polyethylene are rather weak.

To form the adhesive coat, polyethylene varying in molecular weight between about 12,000 and 24,000, preferably between 16,000 and 24,000, are suitably employed. Polyethylene having a molecular weight of about 21,000 (2.0 average melt index) has given particularly good results. For a polyethylene of this molecular weight, the heating schedule as a function of temperature and time shown in Table I following has proved to give an adhesive coating forming particularly strong bonds between the polyethylene liner and the lacquered metal underlayer of the crown cap. For polyethylene of a lower molecular weight, such as DYLT polyethylene, lower baking temperatures and shorter heating periods can be used.

TABLE I

*DYNH polyethylene*

| Bake Temperature, ° F. | Length of Time | | Nature of Adhesion |
|---|---|---|---|
| | Minimum (minutes) | Maximum (minutes) | |
| 330 | 10 | 20 | Weak. |
| 350 | 10 | 20 | Slight. |
| 365 | 8 | 18 | Fair. |
| 370 | 8 | 18 | Do. |
| 375 | 7 | 15 | Good (500 p.s.i. pull). |
| 380 | 5 | 15 | Excellent (2,000 p.s.i. pull). |
| 385 | 5 | 15 | Do. |
| 390 | See Table II | | |
| 395 | 5 | 15 | Do. |
| 400 | 4 | 10 | Good (500–1,000 p.s.i. pull). |
| 410 | 4 | 10 | Do. |
| 420 | 4 | 10 | Do. |

The time dependence of bond strength at a given temperature is shown for heating periods between 5 and 25 minutes at 390° F. in Table II following.

TABLE II

*DYNH polyethylene applied as 10% solution in "Solvesso 100"*

| Baking Time in Minutes at 390° F. | Adhesion (in p.s.i. necessary to break bond) |
|---|---|
| 5 | 500 |
| 6 | 700 |
| 7 | 1,000 |
| 10 | 1,700 |
| 12 | 2,000 |
| 14 | 1,400 |
| 17 | 1,000 |
| 20 | 700 |
| 25 | 500 |

The baking step of the present invention is to be distinguished from baking steps previously known in the art whose object was to form extremely hard varnish-like coatings of high adhesion. In such prior art processes, thin films of polyethylene applied to metal were baked at times ranging for from five minutes at 482° F. (250° C.) up to thirty minutes at about 392° F. (200° C.), which produces a yellow discoloration in the polyethylene film and converts the polyethylene into a material which is no longer soluble in or swollen by hot solvents. Such baking processes, which may be suitable for the formation of impermeable coatings, are not suitable for the subsequent joining thereto of a polyethylene overlayer. Attempts to join polyethylene to a coating so heat treated have resulted in failure at low stress of whatever bond was obtained, or the production of no bond whatever.

The baking step of the present invention must also be distinguished from prior art steps in which a first coating of thermoplastic coating material is subjected to a brief fusion, mainly to bring about removal of unevaporated solvents employed in coating an underlayer with a thermoplastic substance. In the present invention, the polyethylene is maintained at a temperature above its fusion point for more than a brief period—indeed, it is maintained at this temperature until the material is transformed into a substance which will form both a tenacious bond with the lacquered metal underlayer as well as a polyethylene disc subsequently heat sealed thereto.

Finally, the baking step of the present invention must be distinguished from prior art steps in which a polyethylene film is adhered to metal by baking at temperature of nearly 500° F.–600° F. These techniques are unsuitable for bonding polyethylene to lacquer surfaces while retaining adhesive strength for bonding to other polyethylene bodies.

After the baking step above described, the lacquered metal sheets now having a baked film of polyethylene thereon is sent to the presses for the formation of crown caps. As in the prior art, the formed caps are then fed to the "assemblers," where a polyethylene disc is inserted and heat sealed to the previously coated cap.

The heat sealing is effected at a temperature of about 350° F. under a pressure of approximately 15 pounds per square inch for approximately 5 seconds. These are only exemplary temperatures, pressures, and times which conveniently resemble those now used in the art to seal cork liners, and heat sealing may be effected for example at temperatures between 280° F. and 350° F. under pressures which may vary between 5 pounds per square inch and 45 pounds per square inch. At high pressures and temperatures, a satisfactory heat seal may be effected at times as short as 3 seconds, while at lower temperatures or pressures, more time such as up to 10 seconds may be required to bring about sealing.

The nature of the lacquered metal to which the polyethylene adhesive film is applied is not critical, either as to its nature of thickness. Thus, the present process can be employed to make crows formed of lacquered black plate (uncoated sheet steel), lacquered aluminum, or other lacquered metals which have been proposed for use or are used in forming crown caps. Indeed, the present process is not limited to the formation of crown caps, but is applicable generally to the formation of polyethylene coatings on lacquered surfaces.

The lacquers employed in the present invention are well known in the art as "sanitary lacquers" and are now in widespread use for the conventional manufacture of crown caps and interior food can linings. These lacquers may be, for example, of the oleoresin, synthetic hydrocarbon, phenolic, or epoxy families, and are of types such as are disclosed in U.S. Patents 2,793,141 and 2,380,456, for example. One material which has proved particularly suitable is a lacquer containing 100 parts by weight of hydrocarbon resin, 72 parts by weight of Chinawood oil, 172 parts by weight of mineral spirits, and 0.36 part by weight of iron, present as an iron naphthenate containing 6 percent by weight of iron. Numerous other suitable sanitary lacquers are commercially available, such as those sold under the trade names "#18M" (De Soto Chemical Company, Chicago), "#67" (Lilly Varnish Company, Indianapolis), or "#7598" (Interchemical Company, Cincinnati).

The presence of metal naphthenates such as cobalt, iron, or manganese naphthenates as driers in either the metal lacquer or the solution of polyethylene applied thereto, is optional. Generally, the presence of these materials somewhat decreases the bond which can be obtained between the polyethylene adhesive, the lacquered metal, and the polyethylene linear discs subsequently applied, but the strengths obtained are still more than sufficient to meet requirements now imposed on crown cap closures. The advantages of naphthenates is that they somewhat broaden the time-temperature relation suitable for imparting an adhesive quality to the polyethylene intermediate coat. Thus, with naphthenates present, the time interval over which the polyethylene coating may be heated at a given temperature with formation of a suitably strong bond is somewhat broadened, particularly in the direction of higher heating times, permitting wider variation in the process conditions in the baking step.

If present in the lacquers to which the polyethylene is applied, the naphthenates are preferably present in amounts sufficient to cure the coating. If they are to be present in the polyethylene layer itself, metal ions are suitably present in the coating medium in amounts of from 0.03 to 0.3 percent by weight of the polyethylene solids.

The polyethylene linear discs are suitably made of polyethylene having a molecular weight of about 19,000 or higher. Polyethylene of a molecular weight of as low as about 12,000, or as high as 24,000, can also be used. The discs employed as liners normally have a thickness of about 40 mils, but this thickness is not critical to the success of the sealing method, and is merely convenient and conventional in the formation of crown caps. Thicker or thinner polyethylene liners could be employed in other applications without substantial modification of the present process. Although the liners may have different shapes convenient for sealing different types of containers, their shape is not critical to the present invention.

The following specific examples are given further to illustrate the practice of the invention.

EXAMPLE 1

Tin plate of 95 lbs. per base box, ¼ lb. electrolytic tin, matte finish, T-3 temper, commonly used in crown cap manufacture was coated on one face with a conventional sanitary lacquer comprising 100 parts by weight of hydrocarbon resin, 72 parts by weight of Chinawood oil, 172 parts by weight of mineral spirits, and iron naphthenate to give 0.36 part by weight of iron. The lacquer was applied with a roller coater having two metering rollers and a distributing roller of a type commonly used in metal lithography.

The lacquered sheets were moved automatically into a continuous hot-air gas-fired oven and were baked at 340°–360° F. for 10 minutes.

Again, using a roller coater, a hot (160°–780° F.) 5 percent solution of DYNH polyethylene (average molecular weight about 12,000) was applied to the baked lacquer to give an area density of polyethylene of about 2–4 mgm/in.$^2$.

The plate was then baked at 390° F. for 10 minutes, though other plates were baked at temperatures as low as 375° F. for as little as 7 minutes, or as high as 420° F. for as long as 10 minutes with good results.

The sheets were next lithographed on their unlacquered side, and then lubricated with a paraffin wax having a melting point of 105° F. The waxed sheets were then blanked into crown cap shells in a double action blanking press.

The shells were then passed to an assembler where a polyethylene liner of the configuration shown in FIGURE 2 was automatically inserted into each shell and heat sealed therein under a pressure of 15 p.s.i. at 330° F. applied for 3–5 seconds.

EXAMPLE 2

A laquered tin plate like that described in Example 1 was prepared and coated with a polyethylene emulsion containing 35 grams DYLT polyethylene, 8 grams of oleic acid, 8 grams of diethylene triamine, 20 grams of V. M. & P. naphtha, and 125 grams of water. The emulsion was applied to give a dry film area density of 4–6 mgm/in.$^2$ after baking for the times specified in Example 1. The plate was then lithographed, waxed, blanked, and sealed with a liner as earlier described.

Techniques for emulsifying polyethylene are disclosed in the publication "Emulsifiable A–C polyethylene for Polishes," distributed by Allied Chemical Co. Briefly, the technique comprises adding an amine and a carboxylic acid to a polyethylene melt and combining the melt with hot water. Numerous modifications exist, including the addition of an organic solvent to the polyethylene melt, or of an amine to the hot water.

Metal naphthenates may also be incorporated into the emulsion to advantage.

EXAMPLE 3

A lacquered tin plate is prepared and coated with a baked polyethylene film by the procedure of either Example 1 or 2 above. After lithographing, the sheet is heated to about 180° F. for example by induction heating, and polyethylene liner discs 40 mils thick are spotted under slight pressure on the polyethylene coated surface opposite the lithographed spots on the reverse side. With the liner discs only temporarily adhered to the sheet, the entire sheet is fed to a press, where the liner discs are simultaneously sealed under heat and pressure under conditions described earlier. After cooling, the sheets with the adhered liner discs are fed to a blanking press and finished crown caps are stamped out.

EXAMPLE 4

Proceeding as in Examples 1, 2 or 3, a sheet of lithographed tin plate is prepared having a lacquered surface with a baked polyethylene film thereover. An extruded sheet of polyethylene, 20–30 mils thick, is heat sealed as a liner material to the baked polyethylene film under a pressure of about 15 p.s.i. for 3–5 seconds at 330° F. After cooling, the resulting laminate is blanked to form finished crown caps.

Although specific embodiments have been shown and described, it is to be understood they are illustrative and are not to be construed as limiting on the scope and spirit of the invention.

What is claimed is:

1. The method of joining a polyethylene body to a lacquered surface which comprises applying a coating of polyethylene to said lacquered surface, then heating said coating at a temperature between about 350° F. and about 420° F. for from about three minutes to about half an hour, longer times in this range being used with lower temperatures in the range specified, and then sealing said polyethylene body to said heated coating at elevated pressures and temperatures.

2. The method as in claim 1 wherein said polyethylene coating is heated at a temperature between about 365° F. and about 420° F. for from about 4 minutes to about 18 minutes.

3. The method as in claim 1 wherein said coating of polyethylene is applied to said lacquered surface by deposition from a solution of polyethylene dissolved in a solvent.

4. The method as in claim 1 wherein said coating of polyethylene is applied to said surface by deposition from an aqueous polyethylene emulsion.

5. The method as in claim 1 wherein a metal naphthenate dryer is present in said polyethylene coating.

6. The method of joining a polyethylene body to a lacquered surface of a metal to form a laminate adaptable to the manufacture of crown caps, which process comprises applying a coating of polyethylene to the lacquered surface of a metal having a coating of sanitary lacquer thereon, heating said polyethylene coating at a temperature between about 350° F. and 420° F. for from about 3 minutes to about half an hour, longer times in this range being used with lower temperatures in the range specified, and then sealing said polyethylene body to said heated coating at a temperature between about 280° F. and about 350° F. under a pressure between about 5 pounds per square inch and about 45 pounds per square inch.

7. In the method of making a crown cap which comprises applying a coating of a sanitary lacquer to the surface of a metal sheet, curing said coating by baking, forming a crown shell from the lacquered sheet, said shell having said sanitary lacquer coating on interior portions thereof, and then adhering a liner to said baked lacquer surface, the improvement which comprises applying a coating of polyethylene to said lacquer surface, then heating said polyethylene coating at a temperature between about 350° F. and about 420° F. for from about 3 minutes to about half an hour, longer times in this range being used with lower temperatures in the range specified, and then sealing a body of polyethylene, as a liner for said crown cap, to the heat-treated polyethylene coating at elevated pressures and temperatures.

8. A laminate comprising a metal body having a coating a sanitary lacquer on surface portions thereof, a coating of polyethylene over said lacquer coating, said polyethylene coating being heat-treated at about 350° F. to about 420° F. for from about 3 minutes to about half an hour, longer times in this range being used with lower temperatures in the range specified, and a polyethylene body heat-sealed to said heat-treated polyethylene coating.

9. A laminate as in claim 8 in the form of a crown cap comprising a metal shell having an interior coating of sanitary lacquer and a heat-treated polyethylene coating over said lacquer coating, and wherein said polyethylene body is a liner disc for said crown cap.

10. A laminate as in claim 8 wherein said polyethylene body is heat sealed to said heat-treated coating at temperatures between about 280° F. and about 350° F. under a pressure between about 5 pounds per square inch and about 45 pounds per square inch.

11. A laminate as in claim 8 wherein a metal naphthenate dryer is present in said heat-treated polyethylene coating.

References Cited by the Examiner
UNITED STATES PATENTS 2,238,681  4/41  Dorough.
2,697,058  12/54  Lasak.

EARL M. BERGERT, *Primary Examiner.*
ALEXANDER WYMAN, *Examiner.*